United States Patent
Nathan et al.

(10) Patent No.: US 8,726,330 B2
(45) Date of Patent: *May 13, 2014

(54) INTELLIGENT DIGITAL AUDIOVISUAL PLAYBACK SYSTEM

(75) Inventors: Guy Nathan, Yerres (FR); Tony Mastronardi, Pierrefonds (CA)

(73) Assignee: TouchTunes Music Corporation, New York, NY (US)

(*) Notice: Subject to any disclaimer, the term of this patent is extended or adjusted under 35 U.S.C. 154(b) by 681 days.

This patent is subject to a terminal disclaimer.

(21) Appl. No.: 12/458,372

(22) Filed: Jul. 9, 2009

(65) Prior Publication Data

US 2009/0282491 A1    Nov. 12, 2009

Related U.S. Application Data

(63) Continuation of application No. 10/244,031, filed on Sep. 16, 2002, now Pat. No. 7,574,727, which is a continuation of application No. 09/253,734, filed on Feb. 22, 1999, now abandoned.

(51) Int. Cl.
*H04N 5/85* (2006.01)
*H04N 7/173* (2011.01)
*G11B 17/22* (2006.01)
*G06F 11/00* (2006.01)

(52) U.S. Cl.
USPC ........... 725/132; 725/100; 725/133; 725/134; 713/1; 717/178; 369/30.06

(58) Field of Classification Search
USPC ............ 369/30.02, 30.04, 29.01, 30.06; 725/100, 132, 140, 152, 37, 133, 134; 705/1.1; 717/168–178; 713/1, 2
See application file for complete search history.

(56) References Cited

U.S. PATENT DOCUMENTS

| | | |
|---|---|---|
| 3,807,541 A | 4/1974 | Kortenhaus |
| 3,982,620 A | 9/1976 | Kortenhaus |

(Continued)

FOREIGN PATENT DOCUMENTS

| | | |
|---|---|---|
| AU | 199954012 | 4/2000 |
| DE | 3406058 | 8/1985 |

(Continued)

OTHER PUBLICATIONS

"Ecast Forges Landmark International Technology Partnership", Business Wire at www.findarticles.com/cf_0/m0EIN/2000_July_25/63663604/print.jhtml, 2 pages, Jul. 25, 2000.

(Continued)

*Primary Examiner* — Pankaj Kumar
*Assistant Examiner* — Reuben M Brown
(74) *Attorney, Agent, or Firm* — Nixon & Vanderhye P.C.

(57) ABSTRACT

Payment-based audiovisual playback system characterized by comprising a microprocessor device associated with a payment device primarily including means for storing, inter alia, in digital format the visual and sound information to be used. The system is associated through interfaces with display means and sound playback means for providing a multimedia environment. The system is controlled by a multitask operating system including a tool and service library integrated into the storage means. The system, which is also associated through an interface with a telecommunications modem, is optionally connected to an audiovisual data distribution network by a telecommunications modem and telecommunications links, said telecommunications function also being controlled by said multitask operating system.

12 Claims, 3 Drawing Sheets

(56) References Cited

U.S. PATENT DOCUMENTS

| | | |
|---|---|---|
| 4,008,369 A | 2/1977 | Theurer et al. |
| 4,186,438 A | 1/1980 | Benson et al. |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam et al. |
| 4,413,260 A | 11/1983 | Siegel et al. |
| 4,521,014 A | 6/1985 | Sitrick |
| 4,528,643 A | 7/1985 | Freeny, Jr. |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza et al. |
| 4,588,187 A | 5/1986 | Dell |
| 4,593,904 A | 6/1986 | Graves |
| 4,597,058 A | 6/1986 | Izumi et al. |
| 4,636,951 A | 1/1987 | Harlick |
| 4,652,998 A | 3/1987 | Koza et al. |
| 4,654,799 A | 3/1987 | Ogaki et al. |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,760,597 A * | 7/1988 | Hayes et al. .................. 725/109 |
| 4,761,684 A | 8/1988 | Clark et al. |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples, Jr. et al. |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa et al. |
| 4,924,378 A | 5/1990 | Hershey |
| 4,926,485 A | 5/1990 | Yamashita |
| 4,937,807 A | 6/1990 | Weitz et al. |
| 4,949,187 A | 8/1990 | Cohen |
| 4,953,159 A | 8/1990 | Hayden et al. |
| 4,956,768 A | 9/1990 | Sidi et al. |
| 4,958,835 A | 9/1990 | Tashiro et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru et al. |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A | 5/1992 | Vogel |
| 5,138,712 A | 8/1992 | Corbin |
| 5,148,159 A | 9/1992 | Clark et al. |
| 5,155,847 A | 10/1992 | Kirouac |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk et al. |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,339,095 A | 8/1994 | Redford |
| 5,339,413 A | 8/1994 | Koval |
| 5,341,350 A | 8/1994 | Frank et al. |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter et al. |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,546,039 A | 8/1996 | Hewitt et al. |

(56) References Cited

U.S. PATENT DOCUMENTS

| | | |
|---|---|---|
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,751,336 A | 5/1998 | Aggarwal et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,781,889 A * | 7/1998 | Martin et al. .................. 705/1.1 |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,193 A | 3/1999 | Takahashi |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,963,916 A | 10/1999 | Kaplan |
| 5,966,495 A | 10/1999 | Takahashi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |

(56) References Cited

U.S. PATENT DOCUMENTS

| | | |
|---|---|---|
| 6,011,758 A | 1/2000 | Dockes et al. |
| 6,018,337 A | 1/2000 | Peters |
| 6,018,726 A | 1/2000 | Tsumura |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,227 B1 | 4/2001 | Goldstein et al. |
| 6,219,692 B1 | 4/2001 | Stiles |
| 6,223,209 B1 | 4/2001 | Watson |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,356,971 B1 | 3/2002 | Katz et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,130 B1 | 9/2002 | Grapes |
| 6,449,688 B1 | 9/2002 | Peters et al. |
| 6,470,496 B1 | 10/2002 | Kato et al. |
| 6,488,508 B2 | 12/2002 | Okamoto |
| 6,490,570 B1 | 12/2002 | Numaoka |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,789,215 B1 | 9/2004 | Rupp et al. |
| 6,816,578 B1 | 11/2004 | Kredo et al. |
| 6,898,161 B1 | 5/2005 | Nathan |
| 6,904,592 B1 | 6/2005 | Johnson |
| 6,928,653 B1 | 8/2005 | Ellis et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,107,109 B1 | 9/2006 | Nathan et al. |
| 7,124,194 B2 | 10/2006 | Nathan et al. |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,293,277 B1 | 11/2007 | Nathan |
| 7,356,831 B2 | 4/2008 | Nathan |
| 7,406,529 B2 | 7/2008 | Reed |
| 7,424,731 B1 | 9/2008 | Nathan et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,749,083 B2 | 7/2010 | Nathan et al. |
| 7,757,264 B2 | 7/2010 | Nathan |
| 7,783,774 B2 | 8/2010 | Nathan et al. |
| 7,793,331 B2 | 9/2010 | Nathan et al. |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0113824 A1 | 8/2002 | Myers |

(56) References Cited

U.S. PATENT DOCUMENTS

| | | |
|---|---|---|
| 2002/0116476 A1 | 8/2002 | Eyal et al. |
| 2002/0118949 A1 | 8/2002 | Jones et al. |
| 2002/0120925 A1 | 8/2002 | Logan |
| 2002/0129036 A1 | 9/2002 | Ho Yuen Lok et al. |
| 2002/0162104 A1 | 10/2002 | Raike et al. |
| 2003/0005099 A1 | 1/2003 | Sven et al. |
| 2003/0008703 A1 | 1/2003 | Gauselmann |
| 2003/0018740 A1 | 1/2003 | Sonoda et al. |
| 2003/0031096 A1 | 2/2003 | Nathan et al. |
| 2003/0041093 A1 | 2/2003 | Yamane et al. |
| 2003/0065639 A1 | 4/2003 | Fiennes et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0208586 A1 | 11/2003 | Mastronardi et al. |
| 2003/0225834 A1 | 12/2003 | Lee et al. |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2005/0060405 A1 | 3/2005 | Nathan et al. |
| 2005/0073782 A1 | 4/2005 | Nathan |
| 2005/0086172 A1 | 4/2005 | Stefik |
| 2005/0125833 A1 | 6/2005 | Nathan et al. |
| 2005/0267819 A1 | 12/2005 | Kaplan |
| 2006/0018208 A1 | 1/2006 | Nathan et al. |
| 2006/0035707 A1 | 2/2006 | Nguyen et al. |
| 2006/0062094 A1 | 3/2006 | Nathan et al. |
| 2006/0239131 A1 | 10/2006 | Nathan et al. |
| 2006/0293773 A1 | 12/2006 | Nathan et al. |
| 2007/0121430 A1 | 5/2007 | Nathan |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0247979 A1 | 10/2007 | Brillon et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0239887 A1 | 10/2008 | Tooker et al. |
| 2009/0037969 A1 | 2/2009 | Nathan et al. |
| 2009/0070341 A1 | 3/2009 | Mastronardi et al. |
| 2009/0138111 A1 | 5/2009 | Mastronardi |
| 2009/0265734 A1 | 10/2009 | Dion et al. |
| 2009/0282491 A1 | 11/2009 | Nathan |
| 2010/0042505 A1 | 2/2010 | Straus |
| 2010/0211818 A1 | 8/2010 | Nathan et al. |
| 2010/0241259 A1 | 9/2010 | Nathan |
| 2010/0269066 A1 | 10/2010 | Nathan |

FOREIGN PATENT DOCUMENTS

| | | |
|---|---|---|
| DE | 3723737 A1 | 1/1988 |
| DE | 3820835 A1 | 1/1989 |
| DE | A 3820835 | 1/1989 |
| DE | A3820835 | 1/1989 |
| DE | 3815071 | 11/1989 |
| DE | 4 244 198 | 6/1994 |
| DE | 4244198 | 6/1994 |
| DE | 19610739 | 9/1997 |
| DE | 19904007 | 8/2000 |
| EP | 0082077 | 6/1983 |
| EP | A0082077 | 6/1983 |
| EP | 0140593 A2 | 5/1985 |
| EP | O0256921 | 2/1988 |
| EP | 0283304 | 9/1988 |
| EP | A0283350 | 9/1988 |
| EP | A 0283350 | 9/1988 |
| EP | 0 309 298 | 3/1989 |
| EP | 309298 | 3/1989 |
| EP | A 0313359 | 4/1989 |
| EP | A0313359 | 4/1989 |
| EP | 0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | A 0631283 | 12/1994 |
| EP | A0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974896 A1 | 1/2000 |
| EP | 0974941 | 1/2000 |
| EP | 0982695 | 3/2000 |
| EP | 1001391 | 5/2000 |
| EP | 1408427 | 4/2004 |
| FR | A2602352 | 2/1988 |
| FR | A 2602352 | 2/1988 |
| FR | 2808906 | 11/2001 |
| GB | A 2122799 | 1/1984 |
| GB | 2166328 A | 4/1986 |
| GB | 2170943 | 8/1986 |
| GB | 2193420 | 2/1988 |
| GB | A 2193420 | 2/1988 |
| GB | 2 238680 A | 6/1991 |
| GB | 2254469 | 10/1992 |
| GB | 2259398 | 3/1993 |
| GB | A2259398 | 3/1993 |
| GB | 2262170 A | 6/1993 |
| GB | 2380377 | 4/2003 |
| JP | 57-173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5122282 | 5/1993 |
| JP | 5-74078 | 10/1993 |
| JP | 07281612 | 10/1995 |
| JP | 08-279235 | 10/1996 |
| JP | 8274812 | 10/1996 |
| JP | 10-098344 | 4/1998 |
| WO | WO 86 01326 A | 2/1986 |
| WO | A9007843 | 7/1990 |
| WO | WO A 90 07843 | 7/1990 |
| WO | WO 91/08542 | 6/1991 |
| WO | A 9120082 | 12/1991 |
| WO | WO A 91 20082 | 12/1991 |
| WO | WO 93/16557 | 8/1993 |
| WO | A 9318465 | 9/1993 |
| WO | WO A 93 18465 | 9/1993 |
| WO | A94 03894 | 2/1994 |
| WO | WO A 94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |

(56) References Cited

FOREIGN PATENT DOCUMENTS

| WO | WO 96 12258 A | 4/1996 |
|---|---|---|
| WO | WO 98/07940 | 2/1998 |
| WO | WO 98/45835 | 10/1998 |
| WO | WO 01/00290 | 1/2001 |
| WO | WO 01/08148 | 2/2001 |
| WO | WO 02/095752 | 11/2002 |
| WO | WO 2006/014739 | 2/2006 |

OTHER PUBLICATIONS

"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Derfler et al., "How Networks Work", Millennium Ed., Que Corporation, Jan. 2000.
European Search Report from EP 1 993 079.
European Search Report issued for European Application No. 08000845.1-1238/1962251, dated Apr. 3, 2009.
Gralla, "How the Internet Works", Millennium Ed., Que Corporation, Aug. 1999.
Hicks et al., "Dynamic software updating", ACM PLDI, pp. 13-23, 2001.
iTouch 27 New Games brochure, JVL Corporation, 2005, 2 pages.
iTouch 8 Plus brochure, JVL Corporation, 2005, 2 pages.
Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded java classes with MoJo", ACM LCTES, pp. 204-212, 2002.
Patent Abstract of Japan vol. 95, No. 010 & JP 07 281682 A (Naguo Yuasa), 27 Oct. 1 JP 07 281682, figure 1-6 abrége.
Schneier, "Applied Cryptography", Second Edition, John Wiley & Sons, Inc. New York, 1996.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 22, 1999.
Bonczck, Robert H. et al, "The DSS Development System", 1983 National Computer Conference, Anaheim, California, May 16-19, 1983, pp. 441-455.
IBM Technical Disclosure Bulletin, vol. 30, No. 5, Oct. 1987, "Method for Automated Assembly of Software Versions", pp. 353-355.
"Robotic Wafer Handling System for Class 10 Environments" IBM Technical Disclosure Bulletin, vol. 32, No. 9A, Feb. 1990, pp. 141-143.
"Darts Revolution Again", Replay Magazine, Mar. 1991, pp. 146-148.
"High-speed Opens and Shorts Substrate Tester", IBM Technical Disclosure Bulletin, vol. 33, No. 12, May 1991, pp. 251-259.
Galen A. Grimes, "Chapter 18, Taking Advantage or Web-based Audio."
Petri Koskelainem "Report on Streamworks™".
W. Richard Stevens, "TCP/IP Illustrated: vol. 1, The Protocols".
Nowell Outlaw "Virtual Servers Offer Performance benefits for Networks Imaging".

\* cited by examiner

INTELLIGENT DIGITAL AUDIOVISUAL PLAYBACK SYSTEM

CROSS-REFERENCE TO RELATED APPLICATIONS

This application is a continuation of U.S. patent application Ser. No. 10/244,031 filed Sep. 16, 2002, now U.S. Pat. No. 7,574,727; which is a continuation of U.S. patent application Ser. No. 09/253,734 filed Feb. 22, 1999, abandoned, the entire contents of each of which are hereby incorporated by reference.

BACKGROUND OF THE INVENTION

The invention relates to a payment-triggered audiovisual reproduction system.

These audiovisual reproduction systems are generally found in cafes or pubs. This type of system is composed of a sound reproduction machine usually called a jukebox linked to a monitor which displays video images or video clips. To do this, the jukebox is equipped with a compact video disk player and a compact video disk library and includes selection buttons which locate the titles of pieces of music that are available. Payment of a proper fee followed by one or more selections authorizes activation of the system with automatic loading in the player of the disk on which the selected piece is found. Subsequently, the desired audiovisual reproduction is played.

These systems, although allowing reliable and good quality reproduction, nevertheless have major defects. A first defect relates to the space necessary for storing the library; this consequently entails that the system will have large dimensions. Another defect of these systems relates to the mostly mechanical components using sophisticated techniques, which in turn, have high fault rates. Moreover, it is unusual for all the songs on a disk to be regularly heard, but unwanted songs cannot be eliminated from the disk, and the disk occupies physical space. Another problem is caused by the companies that manage and distribute these systems, placing in the circuit a limited number of identical disks and imposing a certain rotation on their customers. As a result, customers must wait when a disk is not available.

SUMMARY OF THE INVENTION

The object of the invention is to eliminate the various defects of the prior art systems. The invention proposes an intelligent digital audiovisual system which is practical to implement, compact, reliable, and enables storage at the title level as well as easy deletion or insertion of titles not listened to or wanted, respectively, while maintaining a large song library and outputting a high level of reproduction quality.

To do this, the audiovisual reproduction system according to the invention is developed around a microprocessor device linked to a payment device. The system includes a memory for storing in digital form the audio and visual information to be used. The microprocessor device is also linked via interfaces to a display and audio reproduction structure allowing formation of a multimedia environment. The ensemble is managed by a multitask operating system including a library of tools and services integrated in the memory.

Thus, all the audiovisual information to be used is digitized and stored in the memory and can be re-read with high fidelity, allowing the audiovisual reproduction system according to the invention to output high-quality songs and graphics.

A new title can be easily introduced into the memory, and a little heard or undesirable title can be easily deleted from the memory. With musical selections, corresponding album covers can likewise be stored in digitized form. The memory stores a minimum of 350 to 400 titles and can be expanded without any difficulty. The simplicity of operation and absence of mechanical components in the system for reproduction of audiovisual information greatly reduce the number of failures, which results in lower cost maintenance. Moreover, the multitask operating system, which includes a library containing a set of tools and services, makes it possible to greatly facilitate operation due to its integration in the memory and the resulting high flexibility. In particular, with the multitask operating system, it is possible to create a multimedia environment by simply and simultaneously managing audio reproduction, video or graphics display and video animation. In addition, since the audiovisual information is digitized and stored in the memory, it uses much less space than for a traditional audiovisual reproduction system, and consequently, the dimensions of the system according to the invention are reduced. Consequently, the dimensions of the housing in which the system is located are greatly reduced, and the cost of the ensemble is likewise greatly reduced. The external appearance of the housing of course can be easily adapted to the nature of the establishment.

Advantageously, the audiovisual reproduction system is moreover linked via an interface to a telecommunications modem, the system then being connected to an audiovisual data distribution system by the telecommunications modem and telecommunications lines, this telecommunications function is likewise managed by the multitask operating system included in the library of tools and services integrated in the memory.

Connection to the audiovisual data distribution network, of a proprietary type, then authorizes the return and quasi-immediate insertion of the desired titles in the memory of this system. The telecommunications lines are preferably high speed telecommunication lines. The multitask operating system, while allowing the formation of a multimedia environment, at the same time allows use of the telecommunications services included in the library of tools and services.

Notably the system can easily be provided with a timer for automatic and periodic activation after a predetermined period of nonuse. This timing function is written into the memory and managed by the multitask operating system. These automatic and periodic activations for partial or complete audiovisual reproductions make it possible to draw customer attention and consequently increase revenues.

Characteristically, the memory stores a catalog of titles relating to available audiovisual data with the corresponding fees. The selection of a title automatically triggers internal processing which totals the sums relative to a chosen title. Thus, the system provides an accurate calculation and verification of fees.

Likewise, each choice of a title is counted for display of use statistics, the display being triggered by activating a predetermined function. According to this characteristic, the system manager or owner is allowed to display, after activating the predetermined function, the statistical total of the various uses. This information guides him in the choice of titles to be retained or discarded. The receipts relative to the fees paid which are thus counted exactly are recovered by the system manager or owner by a key.

The audiovisual reproduction system preferably uses the aforementioned listed components, although certainly additional components could be used, and the invention is not meant to be limited.

BRIEF DESCRIPTION OF THE DRAWINGS

The following description with reference to the attached drawings, given using a non-limiting example, will explain how the invention can be accomplished.

DETAILED DESCRIPTION OF PREFERRED EMBODIMENTS

The hardware components according to the present invention will first be described with reference to FIGS. 1 and 2.

The microprocessor device 22 to be used is a high performance PC-compatible system, such as an Intel 80486 DX/2 system which has memory and the following characteristics.
  compatibility with the local Vesa bus,
  processor cache memory: 256 kB,
  RAM of 32 MB,
  high performance parallel and serial ports,
  SVGA microprocessor graphics adapter,
  type SCSI/2 bus type controller,
  self-powered static RAM.

The display consists essentially of:
  a 14 inch (35.56 cm) flat screen video monitor without interleaving of the SVGA type, with high resolution and low radiation, which is used for video reproduction (for example, the covers of the albums of the musical selection), graphics or video clips,
  a 14 inch (35.56 cm) touch screen "Intelli Touch" from Elo Touch Systems Inc. which includes a glass coated board using "advanced surface wave technology" and an AT type bus controller. This touch screen allows display of various selection data used by the customers and command and management control information used by the system manager or owner. It is likewise used for maintenance purposes in combination with an external keyboard that can be connected to the system which has a keyboard connector for this purpose, controlled by a key lock.

Likewise comprising part of the memory, storage modules 240, 246 using hard disks of the high speed and high capacity SCSI type are connected to the memory in the microprocessor device. These modules allow storage of audiovisual data.

Figure 1:
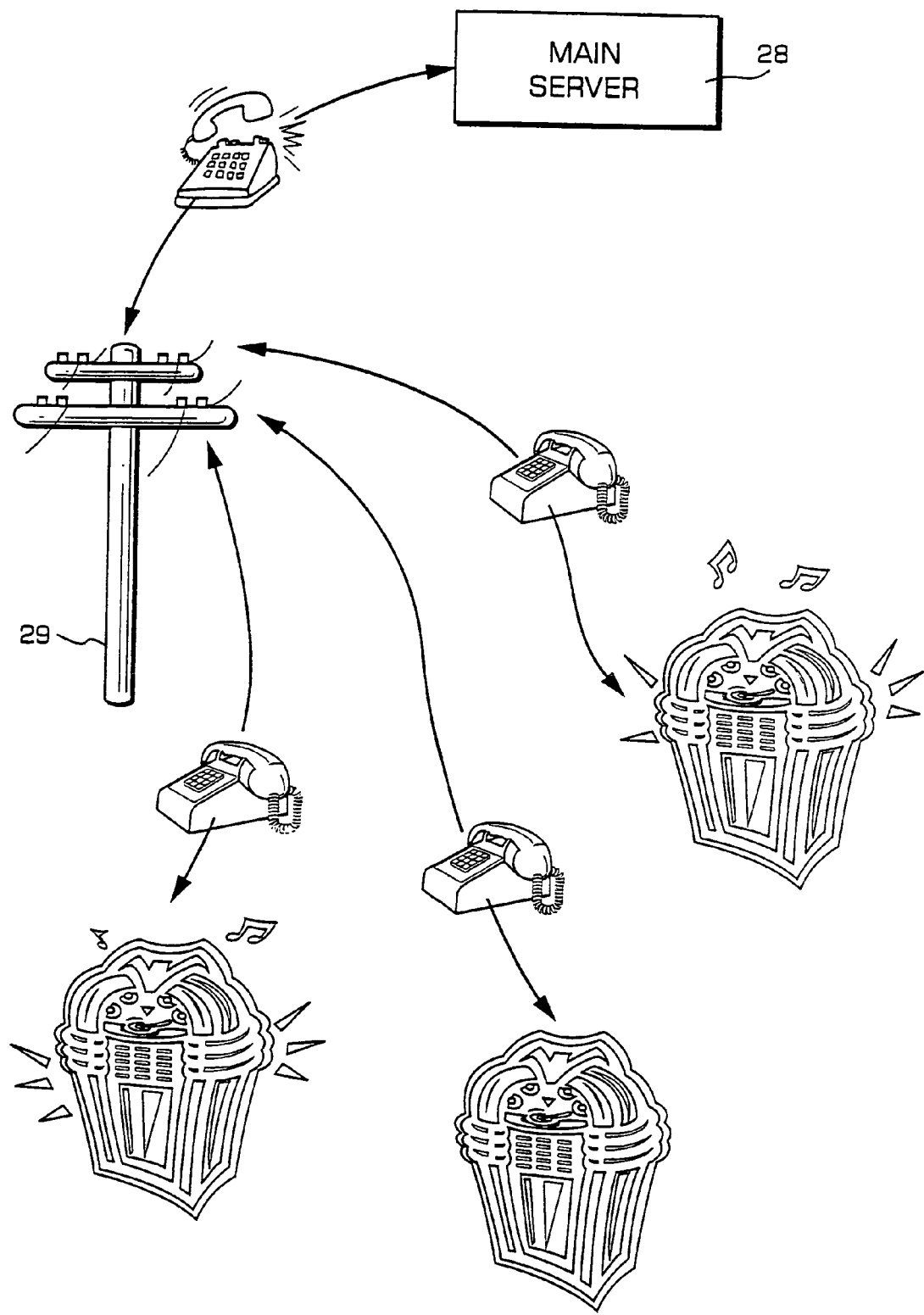
FIG. 1 is a schematic illustration of the audiovisual reproduction jukebox system according to the invention.
Figure 2:
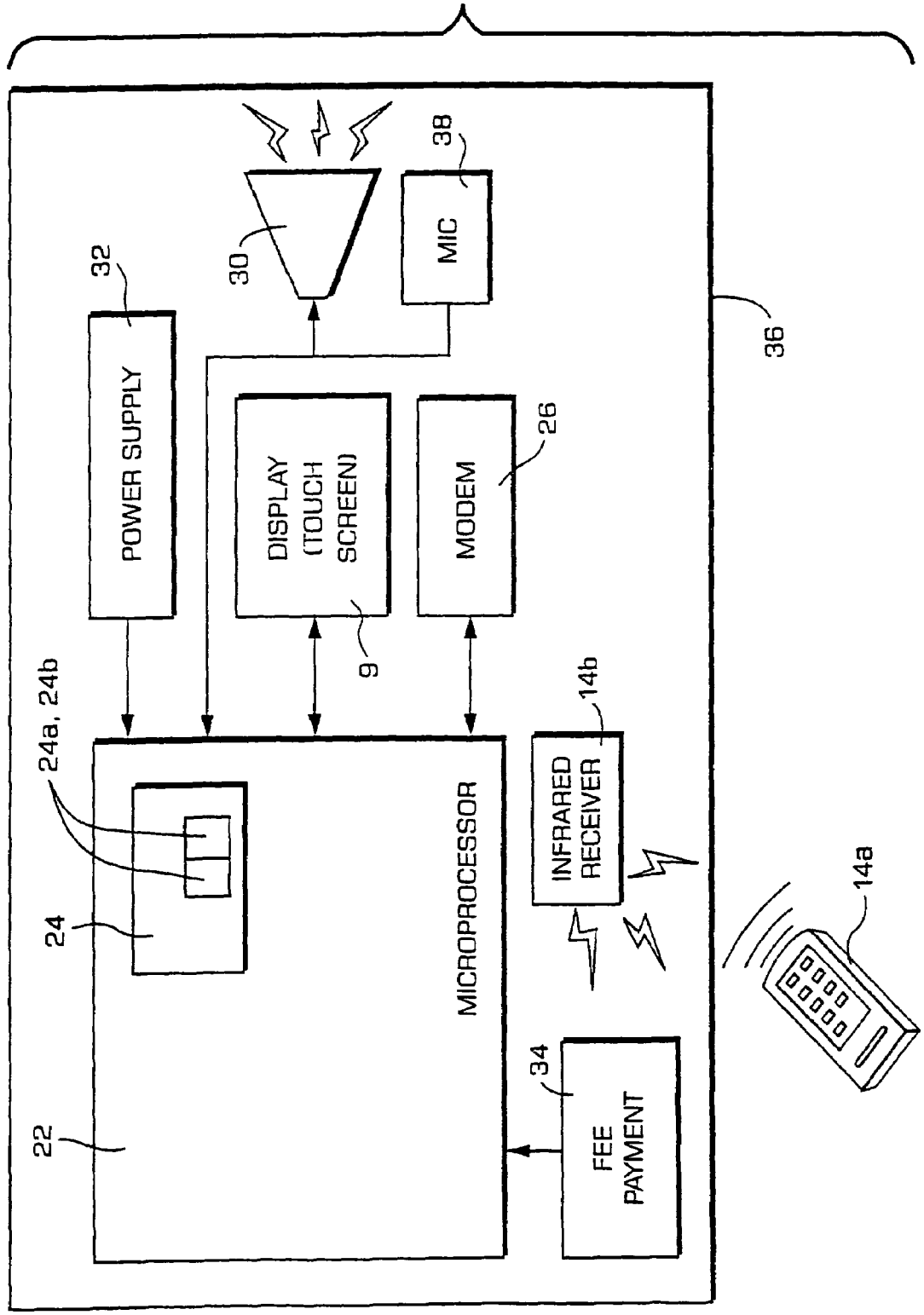
FIG. 2 is a block diagram of the jukebox system.

A high speed 28.8 k/bps telecommunications modem adapter 26 is integrated to enable the connection to the audiovisual data distribution network 28 (FIG. 1).

To reproduce the audio data of the musical selections, the system includes integrated amplified loudspeakers 30 and is equipped with commercial electronic cards of the music synthesizer type which are provided to support a large number of input sources while providing an output with CD (compact disk) type quality, in particular.
  a microprocessor multimedia audio adapter of the "Sound Blaster" type SBP32AWE from Creative Labs Inc.

A thermally controlled 240 watt ventilated power supply 32 provides power to the system. This power supply is protected against surges and harmonics.

The audiovisual reproduction system and especially the microprocessor device are configurable equally by remote control 14, for which the following are used:
  an infrared remote control 14 from Mind Path Technologies Inc., an emitter which has fifteen control keys for the microprocessor system and eight control keys for the projection device.
  an infrared receiver 14b with serial adapter from Mind Path Technologies Inc.

A fee payment device 34 from National Rejectors Inc. is likewise integrated into the system. It is also possible to use any other device which allows receipt of any type of payment by coins, bills, tokens, magnetic chip cards or a combination of means of payment.

To house the system a chassis or frame of steel with external customizable fittings is also provided.

A wireless microphone 38 is incorporated into the system allowing transformation of the latter into a powerful public address system or possibly a karaoke machine. A wireless loudspeaker system can also be used by the system. Finally, remote control allows, for example from behind the bar, access to and control of various commands such as:
  microphone start/stop command,
  loudspeaker muting command,
  audio volume control command,
  command to cancel the musical selection being played.

The choice of software developed or used to operate the audiovisual reproduction system has been oriented to be user-friendly. From this perspective all the characteristics of the system can be controlled via the easy-to-use graphics touch screen in cooperation with an auxiliary voice synthesis system.

To do this, on the touch screen used for control and assistance, at least four control panels can be selected. The first title selection panel helps customers find and select a desired title. A second management control panel controls volume, bass, treble or panoramic control on the video monitor. A third panel scans the title database, for private use, to allow the system manager or owner to examine the database containing the available titles via the audiovisual data distribution network to control and retrieve the titles. A fourth statistics panel, for private use, provides statistical estimations and calculations relative to the titles.

Customer selections of musical pieces are greatly simplified by the graphics interface which has facilities such as browsing the available titles according to various selection criteria, for example title, composer, category, etc. Moreover, when a musical piece is chosen, the album cover to which it belongs can be displayed at the same time as certain statistical data such as the composer of the piece, its length, album label, etc.

For this purpose, the system operating software has been developed around a library of tools and services largely oriented to the audiovisual domain in a multimedia environment. This library advantageously includes a multitask operating system which efficiently enables simultaneous execution of multiple fragments of code. The operating software thus allows concurrent execution, in an orderly manner and avoiding any conflict, of operations performed on the display, audio reproduction structure as well as management of the telecommunications lines via the distribution network. In addition, the software has high flexibility since it allows the owner of the establishment to use options not available before, such as:
  automatic withdrawal to an auxiliary source, for example, a FM tuner, during inactivity of the main function,
  remote control of the audio volume,
  cancelling or skipping a musical piece,
  superposition of a microphone on the existing sound for public address or to convert the system into a karaoke machine, amplifier control with respect to output power, right or left channel balance, control of base or treble frequencies, automatic activation of audiovisual reproduction at controllable intervals when the system is inactive.

Advantageously, the audiovisual data distribution network is an integral part of the system environment according to the invention and it allows the manager or owner of the system to exploit new and powerful possibilities and services such as:

remote technical assistance: either for problems of minor malfunctions by assisting the system manager or owner, or for more major problems by assisting the technicians in locating the fault and the defective component, management of security: each system is connected to a local controller system according to a preestablished time pattern for acquisition of an approval signal in the form of a registration number which authorizes its operation. In addition, if cheating is detected or the system can no longer communicate via the network, the system automatically stops working, acquisition of musical pieces with the album covers: the system manager or owner can select and acquire musical pieces by browsing the selection database. Transfer of a musical piece with its album cover and integration into the list of available titles are done within a very short time, upgrading of the system: corrective maintenance of major or minor problems relative to the system operating software, improvements or upgrades are enabled via the telecommunications lines through the distribution network. Only a few minutes are necessary to transfer these modifications to any network system, collection of statistics: all statistics and data internal to a system are rapidly available to be compiled via the distribution network, the statistics allowing specific and efficient analysis of the entire market situation, billing: the distribution network automatically calls the system which has registered the amounts collected by the system following payment by the user, calculates the composer royalties which the system manager or owner must pay to the distribution network company, and produces the appropriate accounts, marketing and promotion: at the request of a title supplier for promotional purposes high fidelity digital reproduction of a title is available to the system manager or owner during subsequent hours via the distribution network. Digitization of the musical selections which are made available via the distribution network is done using various commercially available software tools, which provide standard formatted data files.

The digitized audiovisual data are stored in a format which uses standard compression. The system decompresses the musical selections stored in the storage means at the instant at which they are reproduced; this allows a considerable reduction in the memory space necessary to store them, while optimizing the delays during transfer via the telecommunications lines.

Each selection is available according to two digitized formats: with a hi-fi quality or CD quality. This authorizes an advantageous balance between the necessary memory space and the required reproduction quality which depends on the effective noise level in the establishment and the quality requirement.

Figure 3:
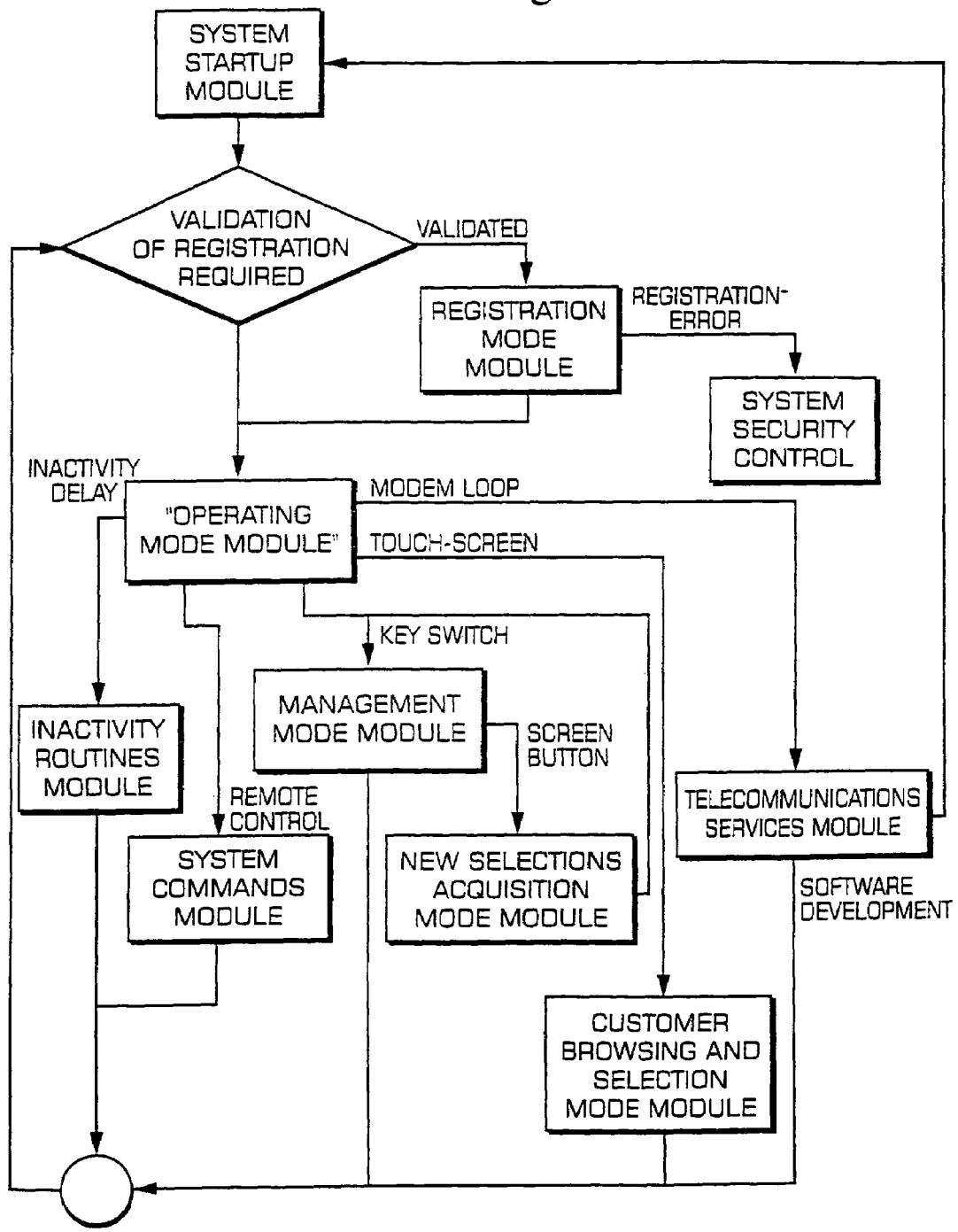
FIG. 3 is a flowchart showing the specific service modules of a task managed by the multitask operating system, the ensemble of modules being included in a library stored in the memory.

With reference to FIG. 3, it is noted that while all the modules described separately seem to be used sequentially, in reality the specific tasks of the modules are executed simultaneously in an environment using the multitask operating system. Consequently the flowchart of FIG. 3 indicates the specific operations which the module must perform and not a branch toward this module which would invalidate all the operations performed by the other modules.

The first module, labeled SSM, is the system startup module. This module does only one thing, and consequently, it is loaded automatically when the system is powered up. If the system is started with a correct registration number, it then directly enters the "in service" mode of the module labeled RRM.

The REG module is the registration mode module which, when it is activated for the first time or when approval for a new registration is necessary, indicates its software serial number and requests that the user enters his coordinates, such as the name of the establishment, address and telephone number. When the system is not registered, it operates only for registration, providing the manager with the appropriate information necessary to activate it. Once the user has finished entering the necessary information, the system proceeds to register itself for a predetermined registration period and then activates itself completely. Before the registration period expires, the system attempts to establish a telecommunications link to a server 28 via the distribution network 29. If a connection is established, it renews its registration with its software serial number and provides to the server the additional user information furnished by the customer. When the registration period expires before the system is able to establish a link and renew its registration, it is invalidated after a configurable grace period has expired and sends the message "out of service". When the manager inserts his key, he is guided for system registration. It is possible to register the system by telephone when a telecommunications line problem or telephone line fault occurs. When a system is registered and activated by the telecommunications network or via a telephone call to the distribution network headquarters, it becomes completely operational in two modes, "user" and "manager" (for system maintenance) for another registration period.

The RMM module enters the "in service" mode when its registration number has been validated. In this mode, the system is ready to handle any request which can be triggered by various predefined events such as:

customers touching the screen: when a customer or user touches the screen, the system transfers control of the foreground session to the CBSM module 19 of the customer browsing and selection mode, telecommunications network server call requests: when the system detects a loop on the phone line, it emits an asynchronous background procedure: the telecommunications services mode of the TSM module 17, requests concerning the key switch: when the manager turns the key switch, the system hands over control of its foreground session to the management mode MMM module 12, reception of a remote control signal: when a command is received, it is processed in a background session by the system command SCM module 15 while the foreground session remains available for other interventions, appearance of end of timing, showing inactivity of the system: when one of the various timers is activated, control is temporarily handed over to the inactivity routines IRM module for processing.

The system remains in the "in service" mode until one of the above described events takes place.

The IRM module 11 is the inactivity routines module. It contains the routines that perform predetermined functions which it can call on when the system is inactive and when a predefined but adjustable time interval has expired. The aforementioned list of functions that the system can handle is of course not limited, and new functions which would be desirable to add to the overall system of the distribution network could be added very easily at any time and as soon as they are created using the remote control services for software upgrading. Such functions can be offered and added for example when requirements have been confirmed regarding management of the ensemble of systems or simply for a given system. Some of these proposed functions with the system are described below:

display of an album cover to announce its presence or its future integration into the system: the system displays a full screen of announcements showing the album covers for a desired interval. Different panoramic effects can be used, zoom forward and back, for example, on the covers of each album to draw the attention of the customers, broadcast of parts of musical pieces present in the system: the manager in this case can control and sample the pieces broadcast during a specific interval and can have these pieces correspond to the album covers on the screen, reproduction of complete selections for internal promotional proposes: the manager can impose a period of defined inactivity after which a randomly selected musical selection is reproduced. At the end of this period, a musical selection is thus taken randomly in the system, then played in its entirety without payment of fees, audio reproductions for external promotional purposes: this option works in the same way as the preceding one, except that it authorizes the system to accept playing of the promotional musical selections for which third parties have paid and which are distributed freely over the telecommunications network, promotional spoken announcements of new musical selections: according to this option, it is possible to verbally promote newly added selections or to add them in the near future to the system via loudspeakers integrated into the system, withdrawal to an auxiliary source: at his discretion the manager can request that the system, when inactive, withdraw to an auxiliary source. For example, when this option is activated and when a FM tuner is connected to the system inputs and the system is inactive, the system directs its auxiliary source input to its main output after the delay determined by the inactivity has expired.

The SCM module 15 is the system commands module. This module allows functions that control the system to accept a required input by an infrared remote control device 14. These functions are handled instantaneously without the process being stopped. A large number of these functions are possible, only some are listed below, in a non-limiting manner:

audio volume control of the played selections,
  audio volume control from the auxiliary played source,
  microphone start/stop command,
  microphone audio volume control,
  balance control, left channel, right channel,
  control of base frequency level,
  control of treble frequency level,
  command to cancel or skip a musical selection,
  panoramic effects command, zoom forward, zoom back,
  triggering of zeroing of the software program.

The MMM module 12 is the management mode module. This module is triggered when the key switch is turned by the manager. The display of an ordinary screen is replaced by a display specific to system management. With this new display, the manager can control all the settings that are possible with remote control. He can likewise take control of additional low level commands allowing for an example definition of commands to be validated or invalidated on the remote control. He is also able to define a maximum of high and low levels for each system output source, these limits defining the range available on the remote control. Using this screen, the manager can access the mode of new selection acquisition by touching a button located on the touch screen. When the manager has succeeded in defining these commands as well as the system configuration, it is then enough to remove the key, and the system returns automatically to the "in service" mode.

The NSAM module is the new selections acquisition mode module. When this mode is activated, a new control screen appears. This mode is designed to assist the manager regarding the location for fast and efficient acquisition of titles of musical selections. To do this, the screen offers different options such as:

search by title,
  search by artist,
  search by category (pop, rock country, etc.),
  alphabetic sorting,
  sorting by issue date.

The manager can browse the ensemble of available titles and select them by simply touching their designation on the screen to load them. Once the selections have been made and the manager has exited the module, the system automatically sends the list of selections to the telecommunications services mode module for processing, and then returns with foreground control to the management mode.

The CBSM module 19 is the customer browsing and selection mode module. Access to this module is triggered from the "in service" mode by touching the screen. When the customer touches the screen, the screen display disappears to make room for a menu provided for convenient browsing assisted by digitized voice messages to guide the user in his choice of musical selections.

The TSM module is the telecommunications services mode module. The TSM module allows management of all management services available on the distribution network. All the tasks specific to telecommunications are managed like the background tasks of the system. These tasks always use only the processing time remaining once the system has completed all its foreground tasks. Thus, when the system is busy with one of its higher priority tasks, the TSM module automatically will try to reduce the limits on system resources and recover all the microprocessor processing time left available. Some of these tasks managed by this module are listed below:

transfer of audio or video data,
  automated accounting of the fees for musical selections,
  accounting of musical selection use,
  collection of statistics,
  system diagnostics,
  system security (integrity),
  monitoring of the selection inventory,
  configuration verification,
  upgrading of software.

The SSC module is the system security control module. Each system is linked to a local system controller according to a preestablished time pattern for acquisition of an approval signal in the form of the registration number, authorizing it to operate. In addition, if cheating has been detected or the system cannot communicate via the network, the system automatically stops working.

The audio visual reproduction system according to the invention has a large number of advantages over systems of the prior art. This powerful system, which uses a computer, can store and reproduce any musical selection while maintaining its original quality. It allows simple and efficient replacement of all mechanical and sophisticated electronic devices of the prior art, which were sources of failures, such as the disk changing arm, lasers, etc., thus greatly reducing maintenance costs. It is simple and compact. The managers or owners of this system can efficiently monitor the titles of the musical selections since they uniquely command the desired titles, thus bypassing a distribution company which ordinarily only acquires a small number of unique titles, then imposes a rotation on their customers. With the present invention, it is possible to acquire only specific titles and at reduced prices, as well as entire CD albums if desired. Consequently, management costs can be significantly reduced. With the integrated interactive video module, this system can also be used for promotional purposes, market research or even as a karaoke machine. Finally, use of a multitask operating system enables simultaneous management providing a major advantage over prior art devices.

What is claimed is:

1. A method of operating a jukebox system, the method comprising:
   providing at least one jukebox device, each said jukebox device including:
      a microprocessor,
      a storage location configured to store digitized and compressed audiovisual items that may be played on the jukebox device in response to requests by a user,
      a display configured to display video,
      an audio arrangement configured to provide audio,
      a communication system connected to an audiovisual distribution server configured to enable the jukebox device to communicate with the audiovisual distribution server for at least the distribution of data containing the audiovisual items, and
      a multitasking operating system configured to enable operation of the microprocessor, the display, the audio arrangement, and the communication system to operate in a user mode and/or in a manager mode;
   selectively downloading, to the storage location, the digitally distributed data containing audiovisual items;
   providing (1) a registration mode of the jukebox device, as a part of the manager mode, in which the jukebox device is operable to initiate and perform system registration functions and is inoperable to play audiovisual items stored in the jukebox device, and (2) a service mode in which the jukebox device is operable to play the audiovisual items stored in the storage location upon selection by the user, the service mode being disabled when the jukebox device is in said registration mode;
   enabling, at least initially, the registration mode of the jukebox device; and
   providing a server remote from the jukebox device that is accessible by the jukebox device through the distribution network and is operable to register the jukebox device via the registration mode of the jukebox device by performing a registration process while in communication with the jukebox device, the registration process resulting in the disabled service mode being enabled so that the audiovisual items become playable on the jukebox device after registration and so that user and/or manager modes become(s) operational, the jukebox device being configured to operate in said registration mode when said jukebox device has not been registered by the server,
   wherein the service mode enables standalone operation of the jukebox device, and
   wherein the jukebox device is further provided with a management mode, the management mode providing an interface enabling management functions to be used and including at least a display of usage statistics including a count of uses of any particular title choice.

2. The method of claim 1, wherein the registration by the server is valid for a predetermined period of time.

3. The method of claim 2, further comprising automatically attempting a new registration process with the server prior to an expiration of the predetermined period of time.

4. The method of claim 3, further comprising exiting the service mode and entering the registration mode when the new registration process does not result in the jukebox device being re-registered by the server.

5. The method of claim 4, further comprising waiting for a grace period to expire before exiting the service mode and entering the registration mode when the new registration process does not result in the jukebox device being re-registered by the server.

6. The method of claim 1, wherein the audiovisual distribution network operates as a digital distribution system for said jukebox device, and
   wherein said jukebox device is operable to digitally request audiovisual items.

7. The method of claim 1, further comprising providing a plurality of jukebox devices, each said jukebox device being configured to seek registration from the server for operation in the service mode.

8. The method of claim 1, wherein the registration by the server is valid for a predetermined period of time, and
   further comprising exiting the service mode and entering the registration mode when the new registration process does not result in the jukebox device being re-registered by the server.

9. The method of claim 1, wherein the storage location is further configured to store a catalog of titles relating to available audiovisual items with corresponding fees, and
   wherein each selection of a title totals sums relative to the selected title.

10. The method of claim 1, further comprising exiting the service mode and entering the registration mode when cheating is detected.

11. The method of claim 1, further comprising exiting the service mode and entering the registration mode after the jukebox device can no longer communicate via the distribution network.

12. The method of claim 1, wherein the registration process includes providing to the server a serial number of jukebox device and/or information about where the jukebox device is located.

* * * * *